United States Patent
Niven-Jenkins et al.

(10) Patent No.: US 9,203,921 B2
(45) Date of Patent: *Dec. 1, 2015

(54) OPERATION OF A CONTENT DISTRIBUTION NETWORK

(75) Inventors: Benjamin P Niven-Jenkins, Ipswich (GB); Paul W Burke, Ipswich (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 346 days.

This patent is subject to a terminal disclaimer.

(21) Appl. No.: 13/058,442

(22) PCT Filed: Aug. 7, 2009

(86) PCT No.: PCT/GB2009/001952
§ 371 (c)(1),
(2), (4) Date: Feb. 10, 2011

(87) PCT Pub. No.: WO2010/023424
PCT Pub. Date: Mar. 4, 2010

(65) Prior Publication Data
US 2011/0145437 A1    Jun. 16, 2011

(30) Foreign Application Priority Data

Aug. 26, 2008  (EP) .................... 08252815
Aug. 26, 2008  (EP) .................... 08252819

(51) Int. Cl.
*G06F 15/173*   (2006.01)
*H04L 29/08*    (2006.01)
(Continued)

(52) U.S. Cl.
CPC ...... *H04L 67/2814* (2013.01); *H04L 29/12783* (2013.01); *H04L 45/586* (2013.01);
(Continued)

(58) Field of Classification Search
CPC ........... H04L 67/1002; H04L 67/2842; H04L 67/2885; H04L 67/1014
USPC ......................................... 709/217, 238, 203
See application file for complete search history.

(56) References Cited

U.S. PATENT DOCUMENTS

| | | | |
|---|---|---|---|
| 2002/0004846 A1* | 1/2002 | Garcia-Luna-Aceves et al. | G06F 12/1483 709/245 |
| 2002/0091760 A1* | 7/2002 | Rozen | H04L 45/306 709/203 |

(Continued)

OTHER PUBLICATIONS

European Search Report dated Jan. 13, 2009 issued in EP 08 25 2819.
(Continued)

*Primary Examiner* — Duyen Doan
(74) *Attorney, Agent, or Firm* — Nixon & Vanderhye PC

(57) ABSTRACT

A partitioned network has several subdomains (1, 2, 3,) each having a respective access server (10, 20, 30) and each serving a plurality of end users (11, 12; 21, 22; 31, 32). Each access server (10, 20, 30) is connected to a respective content cache (13, 23) or a set of such caches (130, 131, 132), which stores content and downloads it to end users on request. An alternative routing (19, 29) may be available between an access server (10) and a content cache (23) other than its associated cache (13), for use in exceptional circumstances. All the content caches (13, 23), are given the same IP address, "W.X.Y.Z". Each access server (10, 20, 30) operates exclusively in a geographic sub-domain, and recognizes the IP address W.X.Y.Z as relating uniquely to its respective associated content cache 13, (23, 23) This means that the configuration of each access server (10, 20, 30) to handle content caching/distribution/streaming can be the same regardless of its location in the network. Any end user (10) can therefore obtain content from the cache (13) which is topologically closest, using the common IP address W.X.Y.Z. No address translation or mapping is required to route requests to the correct local content server. If the access server (10) is unable to connect to the associated content server (13), it is configured to forward traffic to another content cache (23), by tunnelling the request to an access server (20) associated with that second cache. The second access server (20) recognizes the address W.X.Y.Z as being that of its own associated content server (23), rather than the content server (13) associated with the first access server (10), and forwards the request accordingly. The content can then be returned to the address of the requesting user.

12 Claims, 4 Drawing Sheets

(51) Int. Cl.
*H04L 12/713* (2013.01)
*H04L 29/12* (2006.01)
*H04L 29/14* (2006.01)

(52) U.S. Cl.
CPC ............. *H04L 61/35* (2013.01); *H04L 67/289* (2013.01); *H04L 29/12452* (2013.01); *H04L 61/2546* (2013.01); *H04L 67/1002* (2013.01); *H04L 67/2842* (2013.01); *H04L 69/40* (2013.01)

(56) References Cited

U.S. PATENT DOCUMENTS

| | | | |
|---|---|---|---|
| 2003/0079027 A1* | 4/2003 | Slocombe | H04L 29/06 709/229 |
| 2003/0182410 A1* | 9/2003 | Balan et al. | 709/223 |
| 2003/0233423 A1* | 12/2003 | Dilley | H04L 29/06 709/214 |
| 2005/0010653 A1* | 1/2005 | McCanne | H04L 69/329 709/219 |
| 2006/0064478 A1* | 3/2006 | Sirkin | 709/223 |
| 2006/0133371 A1 | 6/2006 | Matoba | |
| 2007/0006270 A1 | 1/2007 | Frigui et al. | |
| 2007/0055764 A1* | 3/2007 | Dilley | H04L 29/06 709/223 |
| 2007/0160058 A1 | 7/2007 | Zhou et al. | |
| 2007/0168548 A1* | 7/2007 | Atogi et al. | 709/238 |
| 2007/0271385 A1* | 11/2007 | Davis | G06F 11/203 709/228 |
| 2008/0082642 A1 | 4/2008 | Wu | |
| 2008/0235400 A1* | 9/2008 | Slocombe | H04L 29/06 709/245 |
| 2010/0034079 A1 | 2/2010 | Boucadair et al. | |
| 2010/0036954 A1* | 2/2010 | Sakata et al. | 709/226 |

OTHER PUBLICATIONS

Rajkumar, Buyya et al., "*A Case for Peering of Content Delivery Networks*," IEEE Distributed Systems Online, IEEE Service Center, New York, NY, vol. 7, No. 10, Oct. 1, 2006, pp. 1-5.

International Search Report for PCT/GB2009/001953, mailed Nov. 16, 2009.

U.S. Appl. No. 13/058,434, filed Feb. 10, 2011 and entitled "Content Distribution Network"; Inventors: Niven-Jenkins et al.

International Search Report for PCT/GB2009/001952, mailed Feb. 17, 2010.

Office Action (16 pgs.) dated Oct. 5, 2012 issued in co-pending U.S. Appl. No. 13/058,434.

* cited by examiner

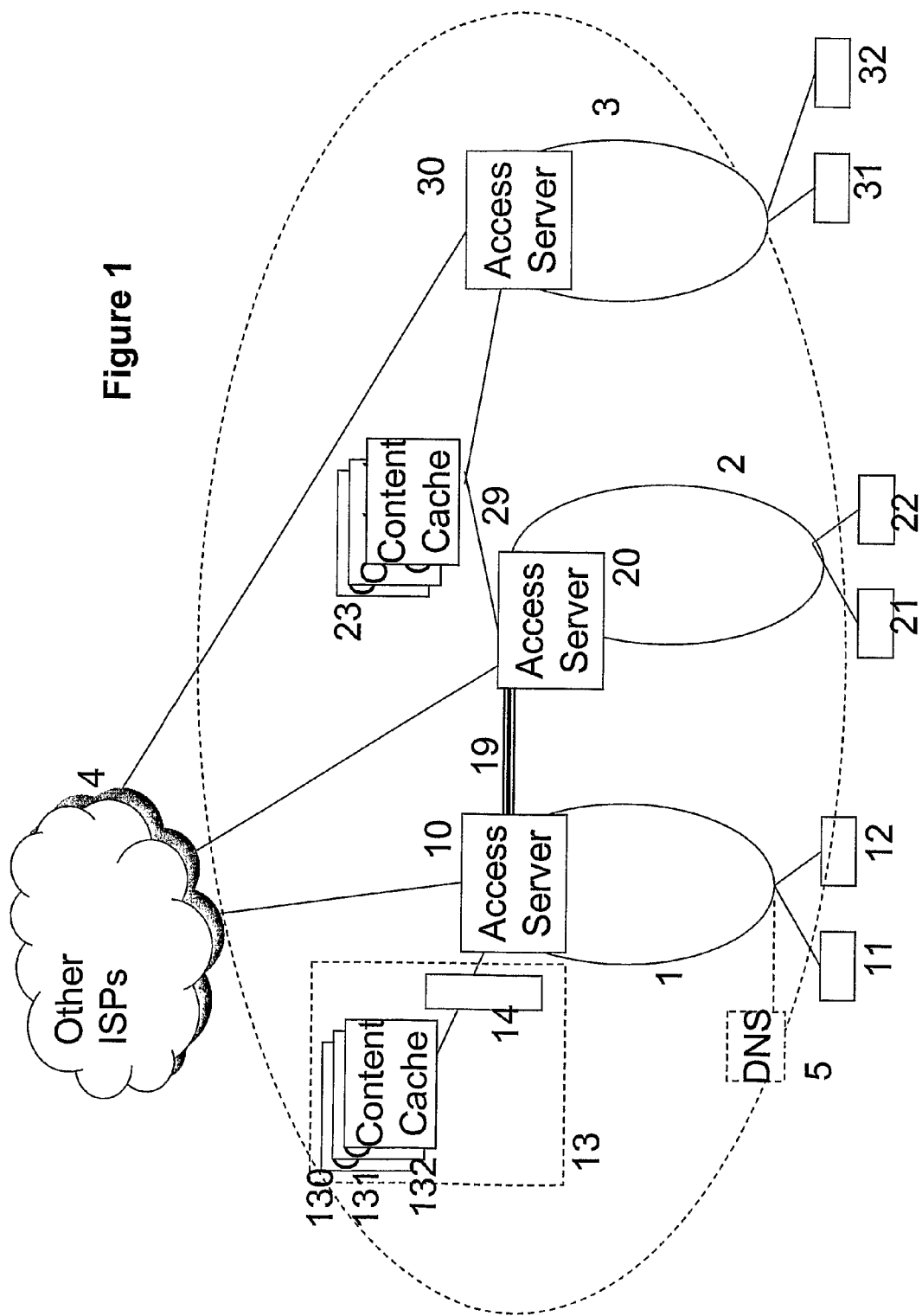

OPERATION OF A CONTENT DISTRIBUTION NETWORK

This application is the U.S. national phase of International Application No. PCT/GB2009/001952 filed 7 Aug. 2009, which designated the U.S. and claims priority to EP Application No. 08252815.9 filed 26 Aug. 2008, and EP Application No. 08252819.1 filed 26 Aug. 2008, the entire contents of each of which are hereby incorporated by reference.

BACKGROUND AND SUMMARY

This invention relates to the operation of content distribution networks.

The distribution of video and other streamed content to users on demand using the internet as a distribution medium has become a major industry. Efficient distribution systems are becoming necessary in order to manage the sheer volume of data to be carried over the network.

One measure that content providers can take is to make the content available from a number of separate content caches instead of a single central server. The individual caches are periodically updated from a master database or server, and may or may not store the same data, (e.g. there is the capability to tailor the content to local conditions, for example different linguistic preferences of the populations of the areas served by each cache). An individual user requiring a data download is directed to one of the caches from which the data can be downloaded.

However, such a system is only efficient if each user request can be directed to the most appropriate cache, normally the closest available one. In existing systems this would require a translation to be made between the network address of the end user (in the initial request message) and the address of the local cache.

In a typical system, the user would request the URL (universal resource location) code of the content provider, e.g. www.contentprovider.co.qq (where qq is a country code). This URL is processed by the domain name system (DNS) server co-operating with the user's browser system to identify a network-compatible internet address, typically a 32 or 128 bit number (e.g. IP address) which identify the network location of the target computer. The domain name system is a set of hierarchical servers. Each DNS server stores a subset of all the correspondences between URLs and IP addresses. If a DNS server does not have a record for a particular URL, the required information is sought from the authoritative DNS server for the domain associated with that URL, which either returns the required IP address or itself refers the request to another DNS server in its hierarchy, and so on. In most arrangements, the required correspondence, once retrieved from a higher level server, is then recorded in all the lower level DNS servers requesting it, thereby allowing more efficient retrieval on subsequent requests.

The URLs for download streaming services and other sites that may be cached are widely advertised and therefore have to be valid for a wide area, generally worldwide. The structure of the internet, and the way in which DNS servers operate, generally require a common IP address to be generated in response to a given URL. If a number of separate content caches are to be provided and accessed efficiently, a way needs to be found to allow the user to be given access to the appropriate one. This could be done by allowing the content provider to redirect users to the appropriate cache, but this would require the content provider to be able to identify where in the network topology the user is located. This is not readily apparent from the user identity (IP address)—the situation may also change dynamically depending on mobility of the user or changes in the configuration of the network. In any case, efficient routing of traffic takes place in the network, and primarily benefits the network operator. It is not necessarily within the content provider's area of expertise. For these reasons a network-based solution would be desirable.

One existing method of directing internet traffic is to implement a routing protocol such as the border gateway protocol (BGP) to maintain a routing policy which maintains a table of IP network addresses, whereby data is routed to the "nearest" or "best" of these destinations as viewed by the routing topology. A system known as "anycast" (by analogy with unicast, broadcast, and multicast) is also sometimes used to enable geographically distributed nodes to share a single IP address. Like broadcast (one-to-all) and multicast (one-to-many), in "anycast" each destination address identifies a set of some or (in broadcast) all receivers in the network as endpoints, but unlike either of these other systems only one of the set of endpoints (the "nearest" or "best") is selected to receive a transmission at any one time. This arrangement requires the routing protocol to maintain the routing list to determine which of the set of receivers is currently the "nearest" or "best" for each user or access point. Changes in network topology, mobility of network users, or other factors require such frequent changes to such a routing list.

The architecture of a modern telecommunications network consists of a number of relatively self-contained subdomains, usually serving different geographical areas although these need not be defined rigidly. A typical example discussed in European patent application EP1331788 provides each subdomain with its own unique IP address. It is known for each such subdomain to have more than one content distribution server associated with it, each such server in a given subdomain having identical content. In such arrangements a load-balancing function is used to determine which of the servers is to service each request for content. Thus the load balancer can provide access using the same network address to any of the servers associated with a given subdomain using the same network address. Examples of such load balancers are discussed in United States Patent application US2006/0133371 and International Patent application WO06/072114.

The subdomains are interconnected both to allow communication between them and to provide robustness, so that in the event of technical difficulties in the equipment serving one subdomain, it can access processing power from and/or obtain connectivity through a neighbouring one. The present invention makes use of this architecture to provide improved access to a content distribution system. Each subdomain can be associated with a specified content cache. Note that this need not be a one-to-one correspondence, as one cache may serve more than one subdomain and one subdomain may be served by more than one cache. Because of the architecture of the network, the cache associated with the same subdomain as the requesting user will be the topologically closest, and therefore the most efficient for it to access.

According to a first aspect of the invention, there is provided a content distribution system comprising a plurality of access servers arranged to route traffic to and from end users on a network, each of said access servers having means for transmitting data packets to an associated content server or group of content servers, wherein all of the content servers in said content distribution system are accessible using the same internet protocol address, and each access server is configured to route any data packets it receives, if addressed to the said internet protocol address, to its respective content server or group of content servers According to a second aspect, the invention provides a method of operating a content distribution system arranged to route traffic between end users and a plurality of content servers all accessible using the same internet protocol (IP) address, by way of a plurality of access servers, wherein each access server is configured to identify the internet protocol address common to the content servers as being associated with a respective content server or group of content servers, and wherein on receipt of a data packet from one of said end users addressed to the said internet protocol address, the access server routes that request to its associated content server or group of content servers.

This architecture differs from the prior art systems in that a common IP address is used not only for all the content servers within a given subdomain, as is known for load balancing, all the separate subdomains also share a network address. This allows the same IP address to be used for access to the service, regardless of which subdomain the user makes contact with. This has advantages both in publicising the network address (for example through a hyperlink in a related webpage) and for consistency of access for mobile users who can use the same network address to access the local content server wherever they may connect to the network.

In a preferred embodiment, the content server is a provider of content for downloading, or streaming, to the end user in response to a data packet or packets incorporating a request for that content. Where a group of content servers are associated with one access server, access is preferably by means of a load balancer or other means for distributing data requests among the group.

Because each access server is associated with a particular content server or group of such servers, each access server can be configured in the same way to route data packets to its associated content server even though there are multiple content servers with the same IP address. It will recognise the common IP address as relating to its associated content server and route content requests accordingly. All the content servers have the same IP address, but this is not a problem as each access server needs only to be able to reach one content server, although an access server may be able to reach more than one content server in which case it will determine which one to route content requests to based on the routing list that it maintains. The user will get the same content whichever access server it makes contact with, because all the content servers have access to the same content (either cached locally or via another content server).

The duplication of IP addresses is possible because each access server can determine, based on the routing list maintained by the access server, to which content server requests should be routed.

In a preferred embodiment, the network is divided into a plurality of network subdomains, each of which is associated with a corresponding access server, and its associated content server. Delivery of the content required by the user is therefore confined to one subdomain. Note however that one content server may serve more than one network division, which may itself be accessed by more, than one access server. Each access server will only ever identify the IP address with the content server with which it is associated. Preferably each access server directs data packets to the content server having the nearest IP-routeable point to the source of the request for content, which is topologically the closest to it and its clients.

To provide robustness to the system the system is preferably configured such that in the event of a content delivery criterion failure condition being detected, all traffic passing through one access server can be redirected to another content server by way of another access server in said content distribution system. This is preferably effected by the provision of routing apparatus arranged to implement said redirection when said failure condition is detected.

Preferably this is achieved by rerouting (e.g. by means of a "tunnel") the request from the initial access server to a second access server elsewhere, the second access server being associated with a different content server. As the content servers both have the same IP address, the second access server will recognise the IP address as relating to its own associated content server and direct the request thereto. However, as the requesting user has a unique IP address, the content server will nevertheless route the downloaded material correctly to the requesting user.

BRIEF DESCRIPTION OF THE DRAWINGS

An embodiment of the invention will now be described by way of example and with reference to the Figures, in which FIG. 1 is a schematic and simplified representation of a network incorporating the invention

DETAILED DESCRIPTION OF PRESENT EXAMPLE EMBODIMENTS

Figure 1A:
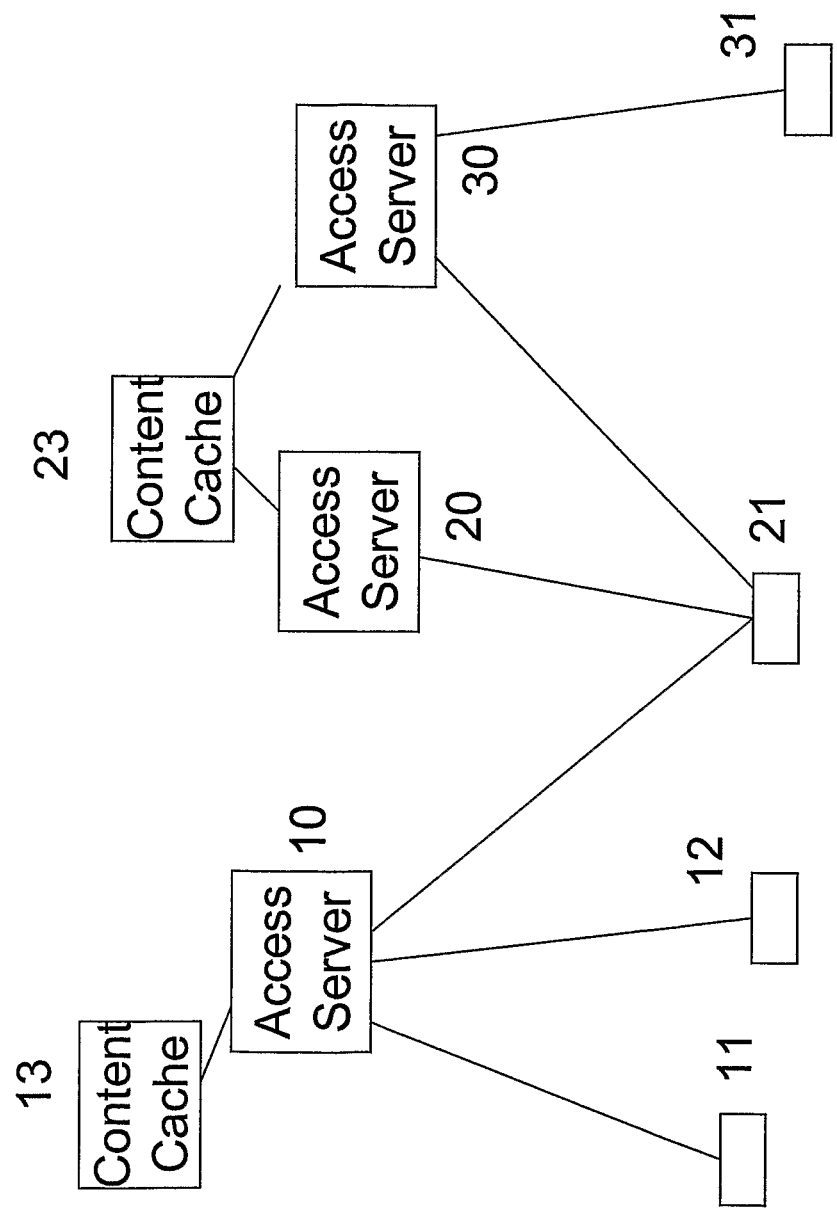
FIG. 1a shows an alternative embodiment

FIG. 1a shows a first, sub-optimal embodiment. In this embodiment a plurality of access servers 10, 20, 30 each have an associated content cache (content server) 13, 23. Two or more access servers 20, 30 may be associated with the same content cache 23. The caches 13, 23 all have the same IP address. A request from a content consumer 11, 12, 21, 31 will be routed to one of the access servers 10, 20, 30. In this embodiment the access server is not pre-determined: routing may depend on load-balancing and other network effects. The access server 10, 20, 30 routes requests for content to its associated cache. Since each access server 10, 20, 30 has its own designated cache, 13, 23 the duplication of IP addresses will not result in any misrouting because each access server 10, 20, 30 will have no record or knowledge of any cache other than the one with which it is associated.

This arrangement is not the preferred embodiment, because the requesting device 21 may access any of several access servers 10, 20, 30 and delivery of content will be from whichever cache 13, 23 is associated therewith. This may not be the optimal delivery route. A preferred embodiment is shown in FIG. 1.

FIG. 1 depicts a simplified partitioned network having several subdomains 1, 2, 3, each having a respective access server 10, 20, 30 and each serving a plurality of end users 11, 12; 21, 22; 31, 32. Each end user connects to the access server which is associated with the geographic network sub-domain in which it is located. The network sub-domain may be a layer-1, layer-2 or layer-3 network.

Each access server 10, 20, 30 is connected to a respective content cache 13, 23 or a set of such caches, which stores content and downloads it to end users on request. A content cache 13 may be co-located with an access server 10, or it may be located elsewhere in the network. A content cache 13 may be dedicated to a single access server 10, or alternatively one content cache 23 may be shared between two or more access servers 20, 30. As will be explained later, an alternative routing 19, 29 may be available between an access server 10 and a content cache 23 other than its associated cache 13, for use in exceptional circumstances.

As shown for content cache 13, each such content cache may in practice consist of multiple devices 130, 131, 132 etc all connected to the access server(s) through a load-balancing device 14 which apportions the demand appropriately between the devices 130, 131, 132.

The access servers 10, 20, 30 are also connected to other networks 4 such as Internet Service Providers, or the Internet itself, or corporate intranets). These external networks 4 may have direct connectivity to each network sub-domain 1, 2, 3, as shown, or they may have aggregated connectivity to the network sub-domains through one or more common interface mediums.

All the content caches 13, 23, are given the same IP address, referred to herein as "W.X.Y.Z". As shown in FIG. 1, the cache 13 comprises several subcaches 130, 131, 132 fronted by a load balancer 14. In such a case it is the load balancer 14 that has the common IP address. This means that the configuration of the access servers 10, 20, 30 to handle content caching/distribution/streaming can be the same regardless of its location in the network.

Figure 2:
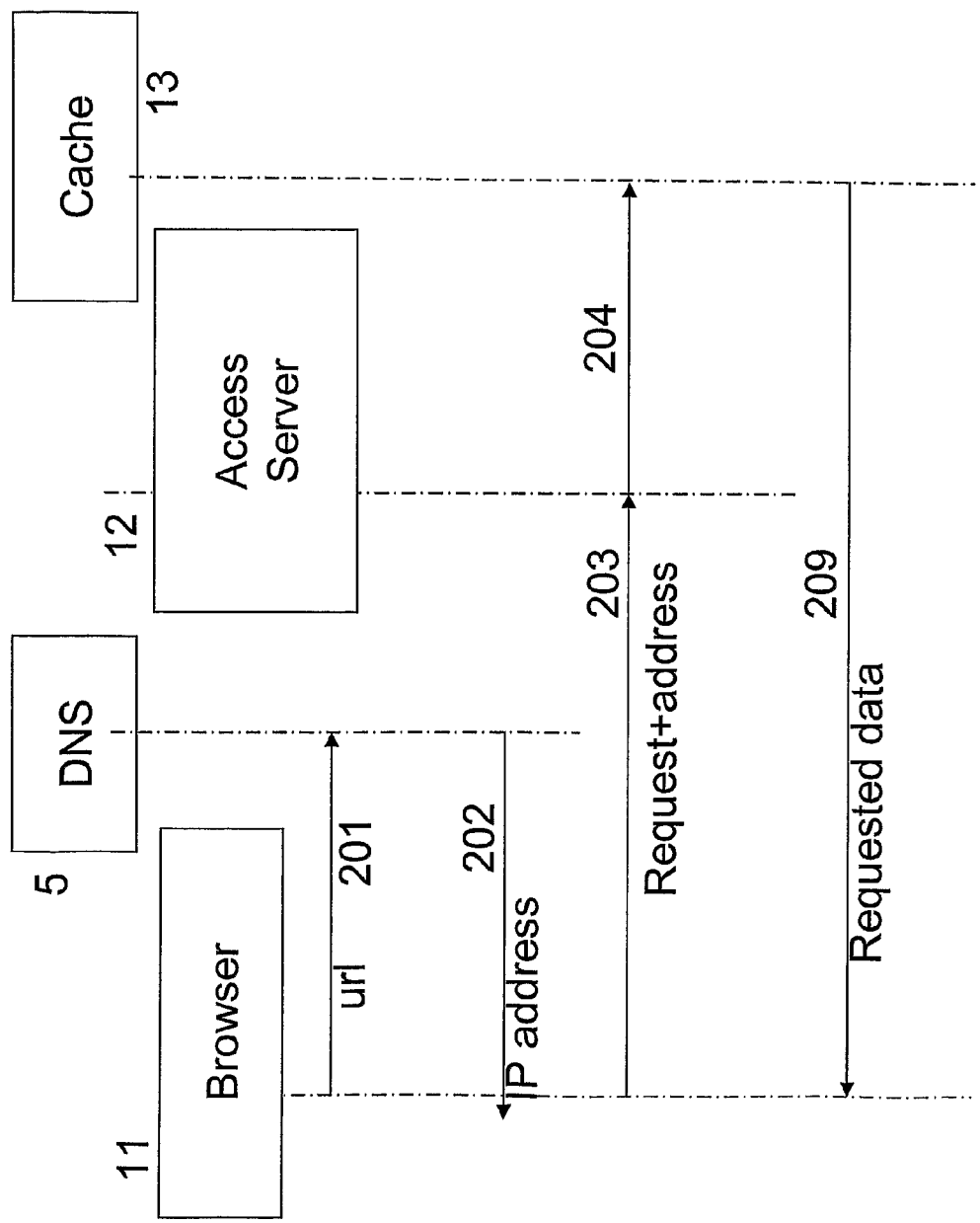
FIG. 2 is a flow diagram illustrating the operation of the system in normal use

The operation of the system in normal use is depicted in FIG. 2. A user requiring the streaming services is told the URL (universal resource location) of a piece of content, for example through a link in a web page, an embedded URL object in a web page, or some other means) and enters the URL code e.g. "www.contentsupplier.co.qq/content" into the browser facility of his terminal 11. The user's browser 11 requests (step 201), from its local DNS server 5, the IP address associated with the DNS name of that URL (i.e. the section of the URL code before the "/"). Instead of a browser, access may be by way of a dedicated client, or some other means.

The DNS system 5 returns the IP address "W.X.Y.Z" associated with that URL (step 202). Note that a unique IP address is associated with the URL, as is conventional, and it is that IP address which is returned to the user 11, regardless of where in the network the user is located. However, this IP address is applicable to all the individual content caches 13, 23.

In an alternative arrangement, the end user's configured DNS content server 5 returns an alternative DNS name shared by all the content caches/streamers (e.g. cdn.company.co.qq). The end user application 11 then requests the IP address associated with this shared DNS name. The DNS server 5 is configured with a list of IP addresses associated with the DNS name in the request. One of these is returned to the End User, the one selected being chosen based on any number of mechanisms and factors such as for load balancing purposes. The list of IP addresses could consist of only a single IP address, e.g. the IP address shared by all the content caches/streamers (i.e. W.X.Y.Z).

Having received the IP address (step 202) the user's browser 11 then transmits a request (203), addressed to the IP address "W.X.Y.Z". This request is routed to the nearest access server 10, which uses standard routing/policy mechanisms to direct end user traffic addressed to that IP address to the content cache 13 associated with that access server 10 (step 204). It can do this without having to take into account the address or geographic location of the end user 11, because each access server 10 operates exclusively in a geographic sub-domain, and so the subdomain 1 to which any end user 11, 12 is connected is necessarily identified as the one associated with the access server 10. Each access server 10 (20, 30) recognises the IP address W.X.Y.Z as relating uniquely to its respective associated content cache 13, (23, 23) which, because of the architecture of the network, is necessarily the closest to any user terminal 11, (21, 31) transmitting a data request to that access server. Thus each access server can be configured in the same way, and no address translation or mapping is required to route requests to the correct local content server.

If the content cache 13 connected to the End User's access server 10 cannot itself deliver the required content to the End User 11, either because it does not hold the data or because it is overloaded with similar requests, it may send a redirect to the browser 11 to cause it to retrieve the content from a different content server 23, which may or may not be co-located with the original content/cache. The content server to which the End User is redirected may have an address S.T.U.V, different from the shared content caching IP address (W.X.Y.Z).

Figure 3:
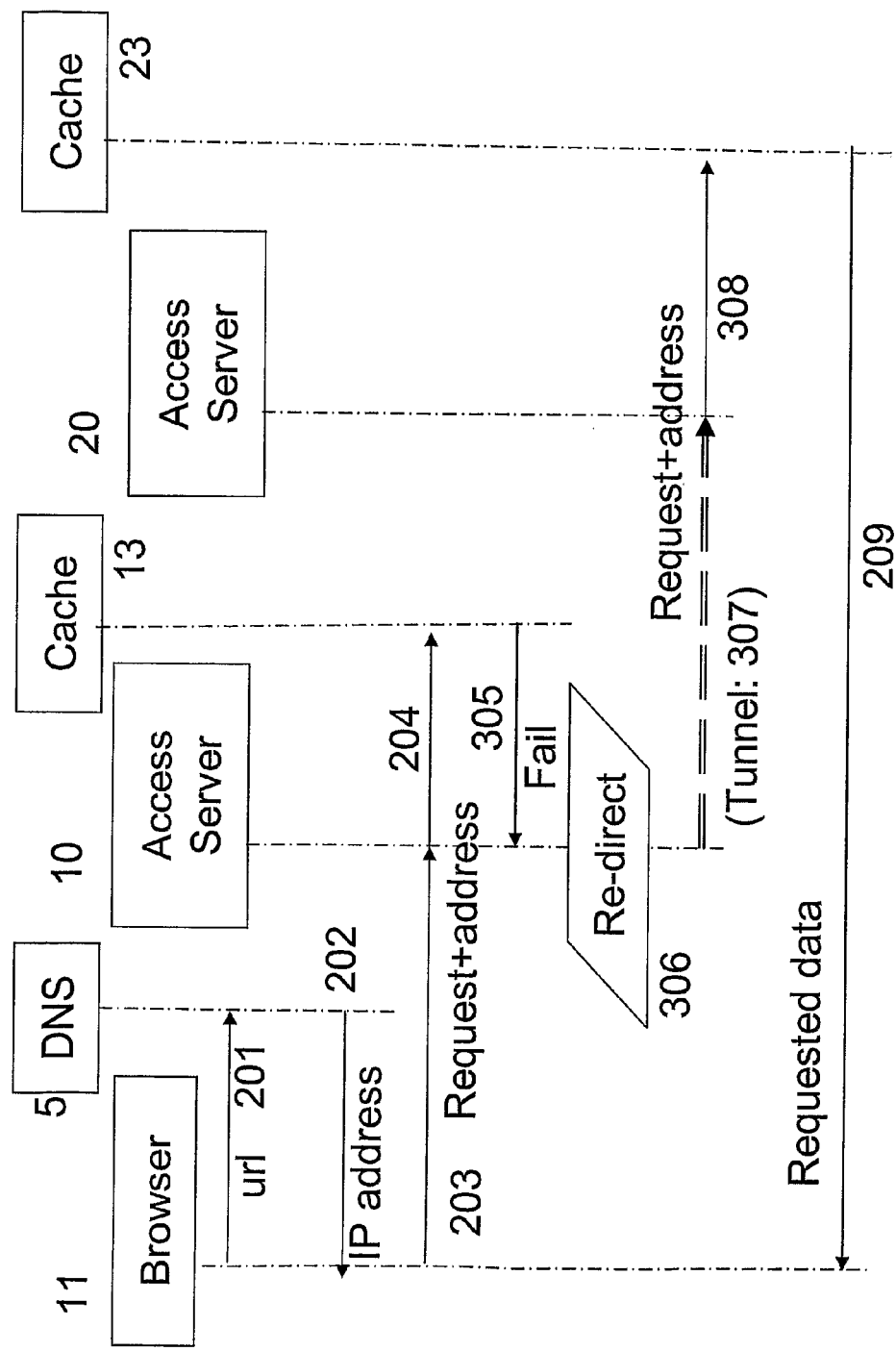
FIG. 3 is a flow diagram illustrating the operation of the system in the event of failure of one of the content caches.

As shown in FIG. 1, an access server 10 may be connected to more than one content cache 13, 23, either directly or via another device such as another access server 20 which in turn is connected to a content cache 23. This allows the system to remain operable in the event of failure of a first content cache 13 or of the connection between the access node 10 and the first content cache 13. Operation of the system in such an event is depicted in FIG. 3.

If the access server 10 is unable to connect to the associated content server 13, it is configured to forward traffic to the second content cache 23. It is not possible for the first access server 10 to redirect requests by simple routing because all the content caches 23, 43 have the same IP address W.X.Y.Z, and so the forwarded request would simply be returned to the local content cache 13. Instead, in the event of a failure (305) to transmit the request to the local cache 13, the request is forwarded by "tunnelling" the request to the second access server 20. This could be done by generating a packet (step 306), for transmission to the second access server 20, including the original request and the cache address W.X.Y.Z, to the network IP address of the second access server 20. Thus the forwarding address applied by the first access server 10 is that of the second access server 20. This request is therefore transmitted to the second access server 20 (step 307). On receiving the forwarded data request, the second access server 20 extracts the data request and identifies the address of the request as "W.X.Y.Z". The second access server 20 recognises this address as being that of its own associated content server 23, rather than the content server 13 associated with the first access server 10, and forwards the request accordingly (step 308). The content can then be returned to the address of the requesting user (step 309).

What is claimed is:

1. A content distribution system comprising a plurality of access servers arranged to route traffic to and from end users on a network, each of said access servers having an associated subdomain comprising a content server or group of content servers, and serving at least one of the end users so that the at least one end user served by one subdomain routes traffic to and from the access server associated with that one subdomain and routes traffic to and from another subdomain only through the access server associated with that one subdomain, and each of said access servers having means for transmitting data packets to content servers in the associated subdomain, wherein an internet protocol address common to all the subdomains is allocated to the content servers, such that each access server is configured to route any data packets addressed to the said internet protocol address to the content server or group of content servers in its respective subdomain.

2. A content distribution system according to claim 1, configured such that each access server directs data packets addressed to the IP address common to the content servers in said subdomains, to the content server or group of content servers of the subdomain having the nearest IP-routeable point to the source of the request for content.

3. A content distribution system according to claim 1 wherein one or more of the access servers are arranged to access an associated group of content servers in its subdomain by means of a load balancer.

4. A content distribution system according to claim 1, wherein each content server is a provider of content for downloading to an end user in response to a data packet incorporating a request for that content.

5. A content distribution system as claimed in claim 1, configured such that, in the event of a content delivery failure condition being detected, traffic passing through one access server is redirected to another access server in said network.

6. A content distribution system as claimed in claim 5, comprising means within the access server for detecting the failure condition.

7. A method of operating a content distribution system arranged to route traffic between end users and a plurality of content servers by way of a plurality of access servers, wherein each access server is associated with a respective subdomain comprising one or more of the content servers and serving at least one of the end users so that the at least one end user served by one subdomain routes traffic to and from the access server associated with that one subdomain and routes traffic to and from another subdomain only through the access server associated with that one subdomain and wherein each access server is configured to identify an internet protocol address which is common to all the subdomains and is allocated to the content servers in all the subdomains as being associated with its respective subdomain, and wherein on receipt of a data packet from one of said end users addressed to the said internet protocol address, the access server routes that packet to its associated content server or group of content servers.

8. A method according to claim 7, in which each access server directs data packets addressed to the IP address common to the content servers in said subdomains, to the content server of the subdomain having the nearest IP-routeable point to the source of the request for content.

9. A method according to claim 7, in which each group of content servers in one of the subdomains is associated with a load balancer through which content is delivered to the associated access server.

10. A method according to claim 7, wherein the content server is a provider of content for downloading to an end user in response to a data packet incorporating a request for that content.

11. A method as claimed in claim 7, wherein in the event of a content delivery failure condition being detected by a first access server attempting to access content from an associated first content server, it causes content to be accessed from a second content server associated with a second access server.

12. A method according to claim 11, in which the first access server re-directs traffic by way of a tunnel to the second access server.

* * * * *